US012670256B2

(12) United States Patent
Cannings et al.

(10) Patent No.: US 12,670,256 B2
(45) Date of Patent: Jun. 30, 2026

(54) IDENTIFY MALICIOUS SOFTWARE

(71) Applicant: Google LLC, Mountain View, CA (US)

(72) Inventors: Richard Cannings, Santa Cruz, CA (US); Sai Deep Tetali, Mountain View, CA (US); Mo Yu, Mountain View, CA (US); Salvador Mandujano, San Jose, CA (US)

(73) Assignee: Google LLC, Mountain View, CA (US)

( * ) Notice: Subject to any disclaimer, the term of this patent is extended or adjusted under 35 U.S.C. 154(b) by 42 days.

(21) Appl. No.: 18/925,605

(22) Filed: Oct. 24, 2024

(65) Prior Publication Data

US 2025/0053654 A1 Feb. 13, 2025

Related U.S. Application Data

(60) Continuation of application No. 18/390,042, filed on Dec. 20, 2023, now Pat. No. 12,141,285, which is a
(Continued)

(51) Int. Cl.
*G06F 21/56* (2013.01)
*G06F 21/52* (2013.01)
(Continued)

(52) U.S. Cl.
CPC ............ *G06F 21/566* (2013.01); *G06F 21/52* (2013.01); *G06N 3/04* (2013.01); *G06N 3/08* (2013.01); *G06F 2221/033* (2013.01)

(58) Field of Classification Search
CPC .. G06F 21/566; G06F 21/52; G06F 2221/033; G06N 3/04; G06N 3/08; G06N 3/0499; G06N 3/09
See application file for complete search history.

(56) References Cited

U.S. PATENT DOCUMENTS

2016/0335432 A1    11/2016  Vatamanu et al.
2017/0366562 A1    12/2017  Zhang et al.
(Continued)

OTHER PUBLICATIONS

International Search Report for the related Application No. PCT/US2018/033646, Dated Dec. 4, 2018, 70 pages.

*Primary Examiner* — Huan V Doan
(74) *Attorney, Agent, or Firm* — Honigman LLP; Brett A. Krueger

(57) ABSTRACT

A method for identifying malicious software includes receiving and executing a software application, identifying a plurality of uniform resource identifiers the software application interacts with during execution of the software application, and generating a vector representation for the software application using a feed-forward neural network configured to receive the plurality of uniform resource identifiers as feature inputs. The method also includes determining similarity scores for a pool of training applications, each similarity score associated with a corresponding training application and indicating a level of similarity between the vector representation for the software application and a respective vector representation for the corresponding training application. The method also includes flagging the software application as belonging to a potentially harmful application category when one or more of the training applications have similarity scores that satisfy a similarity threshold and include a potentially harmful application label.

20 Claims, 11 Drawing Sheets

Related U.S. Application Data division of application No. 17/057,639, filed as application No. PCT/US2018/033646 on May 21, 2018, now Pat. No. 11,880,462.

(51) Int. Cl.
  *G06N 3/04*          (2023.01)
  *G06N 3/08*          (2023.01)

(56)               References Cited

U.S. PATENT DOCUMENTS

2018/0063163 A1      3/2018  Pevny et al.
2019/0026474 A1*   1/2019  Adam .................... G06F 21/563
2019/0056923 A1*   2/2019  Baba .......................... G06F 9/48

* cited by examiner

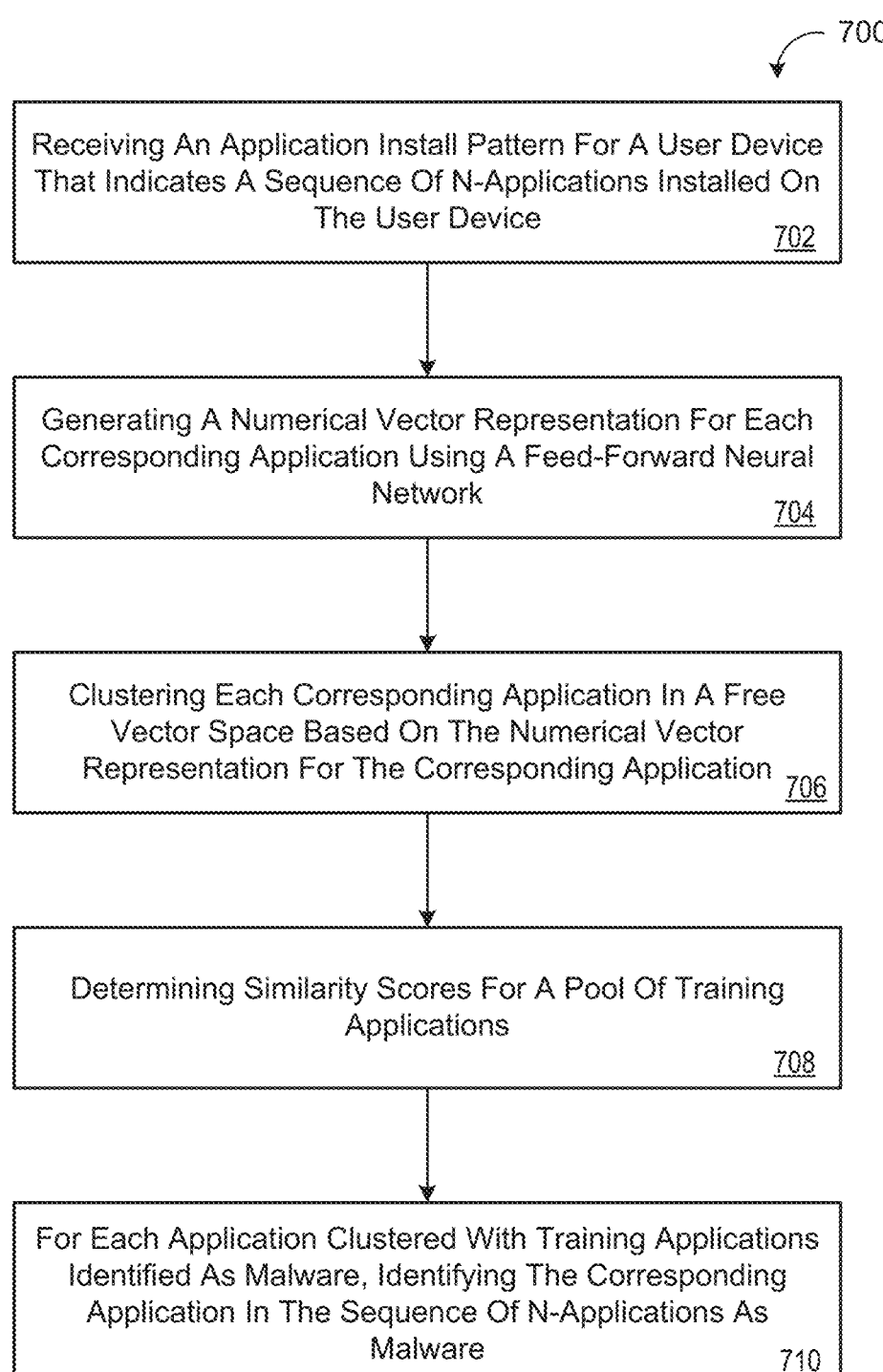

700

Receiving An Application Install Pattern For A User Device That Indicates A Sequence Of N-Applications Installed On The User Device                                                                702

Generating A Numerical Vector Representation For Each Corresponding Application Using A Feed-Forward Neural Network                                                                704

Clustering Each Corresponding Application In A Free Vector Space Based On The Numerical Vector Representation For The Corresponding Application  706

Determining Similarity Scores For A Pool Of Training Applications                                                                708

For Each Application Clustered With Training Applications Identified As Malware, Identifying The Corresponding Application In The Sequence Of N-Applications As Malware                                                                710

FIG. 7

IDENTIFY MALICIOUS SOFTWARE

CROSS REFERENCE TO RELATED APPLICATIONS

This U.S. patent application is a continuation of, and claims priority under 35 U.S.C § 120 from, U.S. patent application Ser. No. 18/390,042, filed on Dec. 20, 2023, which is a divisional of, and claims priority under 35 U.S.C. § 121 from, U.S. patent application Ser. No. 17/057,639, filed on Nov. 20, 2020, which claims priority under 35 U.S.C. § 371 from PCT/US2018/033646, filed on May 21, 2018. The disclosures of these prior applications are considered part of the disclosure of this application and are hereby incorporated by reference in their entireties.

TECHNICAL FIELD

This disclosure relates to identifying malicious software.

BACKGROUND

Malicious software developers attempt to install software (e.g., applications) on user devices in order to cause the user devices to execute operations harmful to users. For instance, malicious software, when installed on a user device, may steal sensitive data from a user, track the user device, and/or perform other fraudulent operations without a user's consent. Malicious software is generally referred to as malware, and once installed on a user device, the malware can continue to grow on the user device and/or spread to other devices in communication with the user device.

Identifying malware is generally a cat and mouse game, where one side continually pursues malware authors that are always updating their methods for installing malware on user devices to evade detection. Generally, malware authors spend significant effort in developing install patterns in order to install malware on user devices without being detected. While humans can add known applications associated with previously identified malware and/or known domain names accessed by malware to whitelists, malicious authors will periodically change the names of the applications and/or domain names in order to evade detection by these whitelists.

SUMMARY

One aspect of the disclosure provides a method for identifying malicious software. The method includes receiving, at data processing hardware, a software application, and executing, by the data processing hardware, the software application. The method also includes identifying, by the data processing hardware, a plurality of uniform resource identifiers the software application interacts with during execution of the software application, and generating, by the data processing hardware, a vector representation for the software application using a feed-forward neural network configured to receive the plurality of uniform resource identifiers as feature inputs. The method also includes, determining, by the data processing hardware, similarity scores for a pool of training applications stored in memory hardware in communication with the data processing hardware, each similarity score associated with a corresponding training application and indicating a level of similarity between the vector representation for the software application and a respective vector representation for the corresponding training application. The method also includes flagging, by the data processing hardware, the software application as belonging to a potentially harmful application category when one or more of the training applications have similarity scores that satisfy a similarity threshold and include a potentially harmful application label.

Implementations of the disclosure may include one or more of the following optional features. In some implementations, identifying the plurality of resource identifiers includes identifying a plurality of domain names the software application visits during the execution of the software application. The feed-forward neural network may include a vector space model configured to determine an n-dimensional numerical vector representation for each of the identified uniform resource identifiers, and calculate the vector representation for the software application by averaging the n-dimensional numerical vector representations for the identified uniform resource identifiers.

In some examples, determining the similarity scores for the pool of training applications includes calculating a respective cosine similarity between the vector representation for the software application and the respective vector representation for each corresponding training application. The vector representation for the software application may include an n-dimensional vector of numerical values. The method may also include retrieving, by the data processing hardware, the training applications associated with the top-k highest similarity scores in the pool of training applications from the memory hardware.

In some implementations, the method also includes identifying, by the data processing hardware, a potentially harmful category associated with a majority of the training applications in the pool of training applications each having the corresponding similarity score that satisfies the similarity threshold and comprising the potentially harmful application label, and assigning, by the data processing hardware, the software application to the identified potentially harmful category. The potentially harmful category assigned to the software application may include one of a hostile downloader application, a phishing application, a rooting Trojan application, a spyware application, a ransomware application, a malware application, or an escalating privileges application. This list of potentially harmful categories is non-exhaustive and may include any other application that is malicious or otherwise potentially harmful. The method may also include, after flagging the software application as belonging to the potentially harmful application category: receiving, by the data processing hardware, a download request to download the software application from a user device in communication with the data processing hardware; and in response to receiving the download request, transmitting a warning notification to the user device, the warning notification indicating that the software application is flagged as belonging to the potentially harmful application category.

Another aspect of the disclosure provides a method for identifying malicious software. The method includes receiving, at data processing hardware, an application install pattern from a user device, the application install pattern indicating a sequence of n-applications installed on the user device. For each application in the sequence of n-applications, the method also includes, generating, by the data processing hardware, a numerical vector representation for the corresponding application using a feed-forward neural network configured to receive each application and the order of each application in the sequence of n-applications as feature inputs, and clustering, by the data processing hardware, the corresponding application in a free vector space based on the numerical vector representation for the corresponding application. The method also includes determining, by the data processing hardware, whether any of the applications in the sequence of n-applications are clustered with training applications identified as malware, and for each application clustered with training applications identified as malware, identifying, by the data processing hardware, the corresponding application in the sequence of n-applications as malware.

This aspect may include one or more of the following optional features. The method may optionally include, for each application in the sequence of n-applications identified as malware; labeling, by the data processing hardware, the application as belonging to a potentially harmful application category; and storing, by the data processing hardware, the application and the corresponding numerical vector representation for the application in the memory hardware in communication with the data processing hardware. The numerical vector representation generated for each corresponding application may include a cryptographic hash.

In some implementations, the method further includes: determining, by the data processing hardware, whether any of the applications in the sequence of n-applications were previously identified as malware; and when at least one of the applications in the sequence of n-applications was previously identified as malware, identifying, by the data processing hardware, one or more of the remaining applications in the sequence of n-applications as malware. The feed-forward neural network model may include a vector space model configured to determine an n-dimensional numerical vector representation for each application in the sequence of n-applications installed on the user device. Additionally, the vector space model may optionally be configured to cluster each application in the sequence of n-applications in the free vector space near training applications having similar n-dimensional numeric vector representations. The method may also include, after identifying a corresponding application in the sequence of n-applications as malware, transmitting a warning notification to the user device, the warning notification indicating that the corresponding application installed on the user device comprises malware.

Another aspect of the disclosure provides a system for identifying malicious software. The system includes data processing hardware and memory hardware in communication with the data processing hardware. The memory hardware stores instructions that when executed by the data processing hardware cause the data processing hardware to perform operations that include receiving a software application, executing the software application, and identifying a plurality of uniform resource identifiers the software application interacts with during execution of the software application. The operations also include generating a vector representation for the software application using a feed-forward neural network configured to receive the plurality of uniform resource identifiers as feature inputs and determining similarity scores for a pool of training applications stored in the memory hardware. Each similarity score is associated with a corresponding training application and indicates a level of similarity between the vector representation for the software application and a respective vector representation for the corresponding training application. The operations also include flagging the software application as belonging to a potentially harmful application category when one or more of the training applications have similarity scores that satisfy a similarity threshold and include a potentially harmful application label.

This aspect may include one or more of the following optional features. In some implementations, identifying the plurality of resource identifiers includes identifying a plurality of domain names the software application visits during the execution of the software application. The feed-forward neural network may include a vector space model configured to determine an n-dimensional numerical vector representation for each of the identified uniform resource identifiers, and calculate the vector representation for the software application by averaging the n-dimensional numerical vector representations for the identified uniform resource identifiers.

In some examples, determining the similarity scores for the pool of training applications includes calculating a respective cosine similarity between the vector representation for the software application and the respective vector representation for each corresponding training application. The vector representation for the software application may include an n-dimensional vector of numerical values. The operations may also include retrieving the training applications associated with the top-k highest similarity scores in the pool of training applications from the memory hardware.

In some implementations, the operations also include identifying a potentially harmful category associated with a majority of the training applications in the pool of training applications each having the corresponding similarity score that satisfies the similarity threshold and comprising the potentially harmful application label, and assigning the software application to the identified potentially harmful category. The potentially harmful category assigned to the software application may include one of a hostile downloader application, a phishing application, a rooting Trojan application, a spyware application, a ransomware application, a malware application, or an escalating privileges application. This list of potentially harmful categories is non-exhaustive and may include any other application that is malicious or otherwise potentially harmful. The operations may also include, after flagging the software application as belonging to the potentially harmful application category: receiving a download request to download the software application from a user device in communication with the data processing hardware; and in response to receiving the download request, transmitting a warning notification to the user device, the warning notification indicating that the software application is flagged as belonging to the potentially harmful application category.

Another aspect of the disclosure provides a system for identifying malicious software. The system includes data processing hardware and memory hardware in communication with the data processing hardware. The memory hardware stores instructions that when executed by the data processing hardware cause the data processing hardware to perform operations that include receiving an application install pattern from a user device, the application install pattern indicating a sequence of n-applications installed on the user device. For each application in the sequence of n-applications, the operations also include generating a numerical vector representation for the corresponding application using a feed-forward neural network configured to receive each application and the order of each application in the sequence of n-applications as feature inputs, and clustering the corresponding application in a free vector space based on the numerical vector representation for the corresponding application. The operations also include determining whether any of the applications in the sequence of n-applications are clustered with training applications identified as malware, and for each application clustered with training applications identified as malware, identifying the corresponding application in the sequence of n-applications as malware.

This aspect may include one or more of the following optional features. The operations may optionally include, for each application in the sequence of n-applications identified as malware: labeling the application as belonging to a potentially harmful application category; and storing the application and the corresponding numerical vector representation for the application in the memory hardware in communication with the data processing hardware. The numerical vector representation generated for each corresponding application may include a cryptographic hash.

In some implementations, the operations further include: determining whether any of the applications in the sequence of n-applications were previously identified as malware; and when at least one of the applications in the sequence of n-applications was previously identified as malware, identifying one or more of the remaining applications in the sequence of n-applications as malware. The feed-forward neural network model may include a vector space model configured to determine an n-dimensional numerical vector representation for each application in the sequence of n-applications installed on the user device. Additionally, the vector space model may optionally be configured to cluster each application in the sequence of n-applications in the free vector space near training applications having similar n-dimensional numeric vector representations. The operations may also include, after identifying a corresponding application in the sequence of n-applications as malware, transmitting a warning notification to the user device, the warning notification indicating that the corresponding application installed on the user device comprises malware.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 7 is a flowchart of an example arrangement of operations for a method of identifying malicious software.

Like reference symbols in the various drawings indicate like elements.

DETAILED DESCRIPTION

Figure 1:
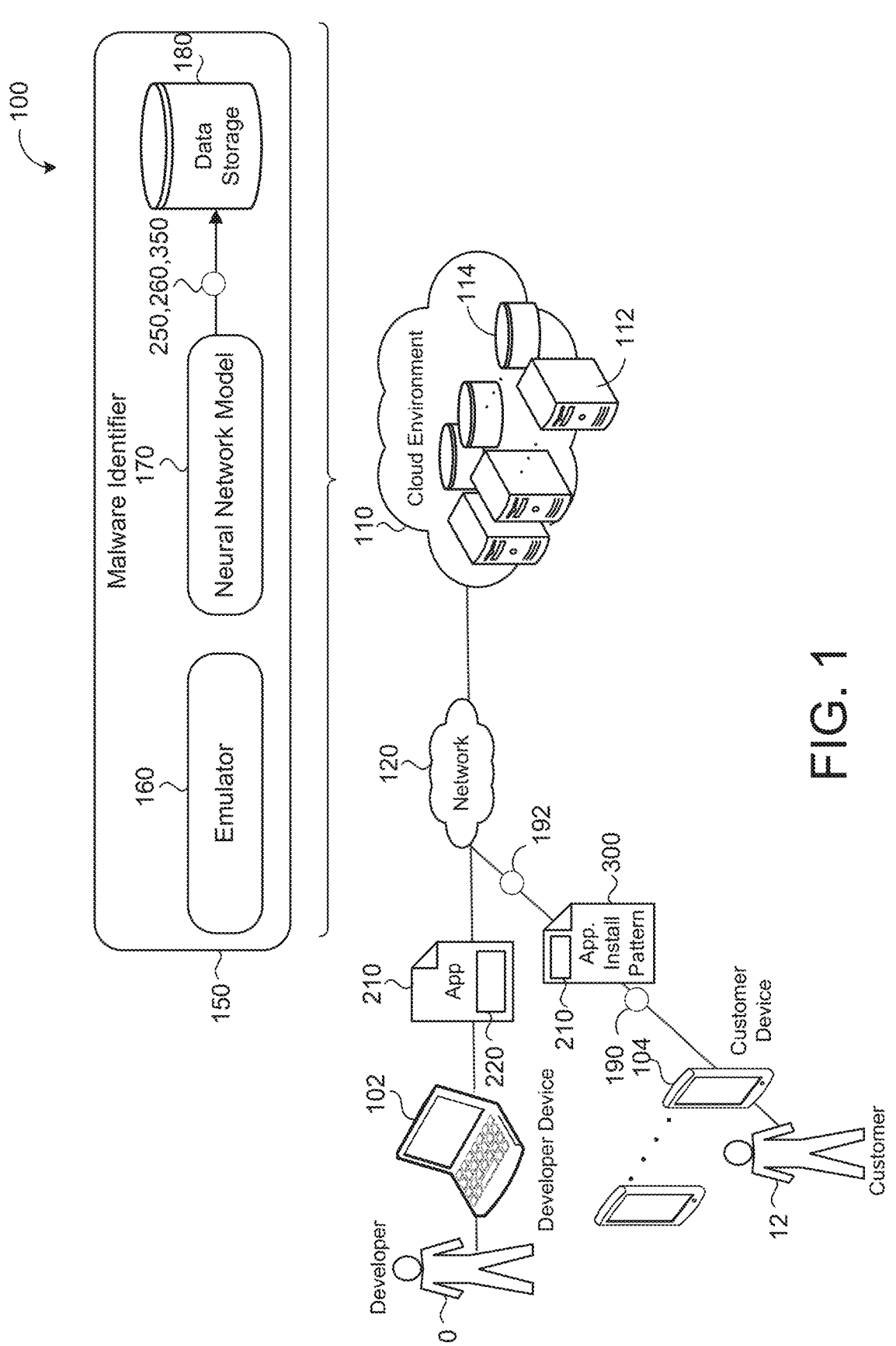
FIG. 1 is a schematic view of an example system for identifying malicious software.

This disclosure is directed toward identifying malicious software based upon an application install pattern from a user device and/or uniform resource identifiers (URIs) that a software application interacts with during execution in a controlled environment. The URIs may include uniform resource locators (URLs) or domain names. An application install pattern indicates a sequence of applications installed on a corresponding user device. As used herein, the term 'sequence of applications' refers to which applications are installed on the user device and the order in which the applications are installed on the user device. Generally, a user device infected with malware will alter the application install pattern on the device as the malware builds by controlling the user device to continue installing malicious software applications on the user device. On the other hand, malicious software executing on a user device may also access/interact with specific URIs in order to connect the user device to malicious servers for infecting the user device with malware and/or extracting user sensitive data from the user device.

The techniques described herein for identifying malicious software help to ensure/maintain the integrity and security of a user device, to avoid or reduce the likelihood of the device, or data therein, becoming corrupted or accessed, used, modified, and/or distributed in an unauthorized manner. The proposed techniques may allow for this to take place, without unduly affecting/interfering with user engagement with a user device and, in the case of the techniques that identify URIs including URLs or domain names, without the application necessarily even being first downloaded to a user device.

In some implementations, malicious software is identified using a neural network model trained upon application install patterns from different user devices. The neural network model may include a vector space model that determines an n-dimensional numerical vector representation in a vector space for each application in a corresponding application install pattern of a corpus of application installed patterns. The n-dimensional numerical vector representation may be referred to as a corresponding hash or embedding in the vector space. During training, the vector space model automatically clusters the applications based on the n-dimensional numerical vector representations in the vector space such that each cluster of applications may indicate/identify a corresponding application category. For instance, news applications may be clustered together, social media applications may be clustered together, and different types of malware may be clustered together. Advantageously, when the vector space model clusters a new or unknown application into a category associated with previously identified malware, there is a strong assumption that the new or unknown application is also malware. Moreover, when an application in a given install pattern has been previously identified as malware, the vector space model may identify other applications in that same install pattern as new variations of malware that may not have been identified.

In other implementations, the neural network model is trained upon URIs that different software applications interact with to identify malicious software. The URIs may include URLs associated with domain names the different software applications access while executing in a controlled execution environment. For instance, when a software application is released by a developer, an emulator may execute the software application in a controlled execution environment and identify the URIs (e.g., domain names) the software application interacts with during execution of the software application. In some examples, the neural network model includes a vector space model configured to determine an n-dimensional numerical vector representation in a vector space for each of the identified URIs (e.g., domain names) and calculate a vector representation for the software application by averaging the n-dimensional numerical vector representations for the identified URIs. During training, the vector space model determines vector representations for a pool of training applications and automatically clusters the training applications based on the vector representations such that each cluster of applications may indicate/identify a corresponding application category. Advantageously, by representing a new or unknown application based on corresponding n-dimensional numerical vector representations for URIs associated with the application, the new/unknown application may be assigned to a category associated with other applications represented by similar n-dimensional numerical representations for URIs associated with those applications. Hence, new or unknown applications may be flagged as potentially harmful when they fall into a category that includes other applications previously labeled as being potentially harmful.

Referring to FIG. 1, in some implementations, an example system 100 includes a developer device 102 and a customer device 104 in communication with a remote system 110 via network 120. The developer device 102 may be associated with a developer 10 that releases software applications 210 onto the remote system 110 and the customer device 104 may be associated with a customer 12 that may download released software applications 210 from the remote system 110. The remote system 110 may be a distributed system (e.g., a cloud environment) having scalable/elastic computing resources 112 (e.g., data processing hardware) and/or storage resources 114. In some implementations, computing resources 112 of the remote system 110 execute a malware identifier 150 that receives a software application 210 released by the developer device 102 and/or receives an application install pattern 300 indicating a sequence of applications 210 installed on the customer device 104. In some examples, the applications 210 correspond to mobile applications. The remote system 100 may communicate with data storage (e.g., memory hardware) 180.

In some implementations, the malware identifier 150 of the data processing hardware 112 implements an emulator 160 configured to execute the software application 210 received from the developer device 102 in a secure execution environment and identify one or more uniform resource identifiers (URIs) 220 the software application 210 interacts with (i.e., accesses) during execution of the software application 210. As used herein, the URIs may refer to domain names 220 or uniform resource locators (URLs) 220 associated with respective domain names. The emulator 160 may include one or more test devices capable of executing the software application 210 in a secure execution environment. The test devices may include virtual devices and/or physical devices.

Additionally, the malware identifier 150 of the data processing hardware 112 employs a neural network model 170 that may be trained using URIs 220 as feature inputs. The training URIs 220 may be associated with a pool of training applications 210 that interact with the training URIs 220 such that the neural network model 170 calculates a numerical vector representation 250 (e.g., domain embedding) in a free vector space for each URI 220 and then generates a corresponding vector representation 260 (e.g., application embedding) for each training application 210 by averaging the numerical vector representations for the corresponding URIs 220. The neural network model 170 may store the numerical vector representations 250 for the URIs 220 and the vector representations 260 for the training applications 210 in the data storage hardware 180.

In some examples, the neural network model 170 is trained using application install patterns 300 from different customer devices 104 as feature inputs. Each training application install pattern 300 indicates a corresponding sequence of n-applications 210 installed on the corresponding customer device 104. In these examples, the neural network model 170 is configured to calculate a numerical vector representation 350 in a free vector space for each application 210 of a corresponding training application install pattern 300 and cluster each application 210 in the free vector space based on the corresponding numerical vector representation 350. The numerical vector representation 350 may also be referred to as an application embedding 350. The neural network model 170 may store the numerical vector representations 350 for the applications 210 of the training application install patterns 300 received from the customer devices 104 in the data storage 180. In some implementations, each numerical vector representation 350 (domain embedding) is represented as a cryptographic hash value that cannot be decrypted back. For instance, each application embedding 350 may include a corresponding cryptographic hash obtained from a secure hash algorithm (SHA) such as the SHA-256 algorithm generating a 256-bit (32-byte) hash. In some examples, the neural network model 170 determines a corresponding vector representation 360 for each application install pattern 300 that is composed of multiple hashes each associated with a corresponding application embedding 350 representing a corresponding application 210 installed on the customer device 104. The hashes in vector representation 360 are ordered by application install date such that the first hash in the vector representation 360 identifies the first application 210 in the sequence of n-applications 210 installed on the customer device 104.

Figure 2A:
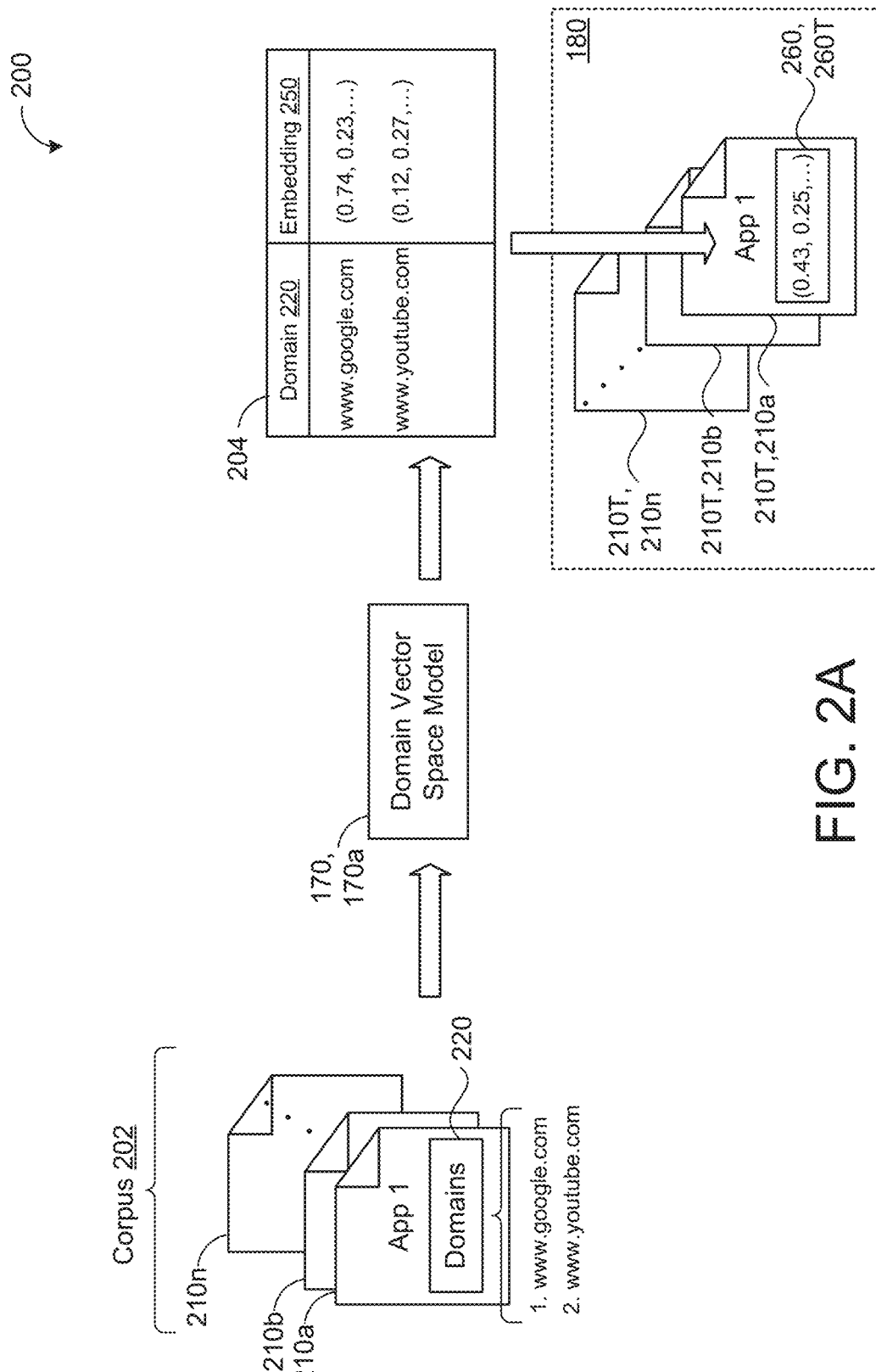
FIGS. 2A-2D are schematic views of an example domain embedding process for identifying malicious software.

Referring to FIGS. 2A-2D, in some implementations, the malware identifier 150 of the data processing hardware 112 executes a domain embedding process 200 for identifying malware. FIG. 2A shows the process 200 receiving a corpus 202 of training applications 210, 210T, 210a-n. The emulator 160 executes each application 210 in a secure execution environment and identifies a set of URIs 220 that each application 210 interacts with during execution of the corresponding application 210. In the example shown, the URIs 220 include domain names. In other examples, the URIs 220 may include uniform resource locators (URLs) that may translate to respective domain names. The neural network model 170a may include a domain vector space model 170a that receives the identified set of domain names 220 (e.g., www.google.com and www.youtube.com) associated with a given application 210 as feature inputs and determines an n-dimensional numerical vector representation 250 (e.g., domain embedding) for each domain name 220. In some examples, each domain embedding 250 is associated with a 100-dimensional numerical vector representation in a free vector space. In the example shown, the domain vector space model 170a outputs a mapping (e.g., hash map) 204 between each domain name 220 and the corresponding domain embedding 250.

In some examples, each domain embedding 250 is represented as a cryptographic hash value that cannot be decrypted back. For instance, each domain embedding 250 may include a corresponding cryptographic hash obtained from a secure hash algorithm (SHA) such as the SHA-256 algorithm generating a 256-bit (32-byte) hash. The domain vector space model 170a may further determine a vector representation 260 for each training application 210T by averaging the domain embedding 250 for the corresponding domain names 220. The mapping (e.g. hash map) 204 between each domain name 220 and domain embedding 250 and the vector representation 260T for each application 210T may be stored in the data storage 180.

Figure 2B:
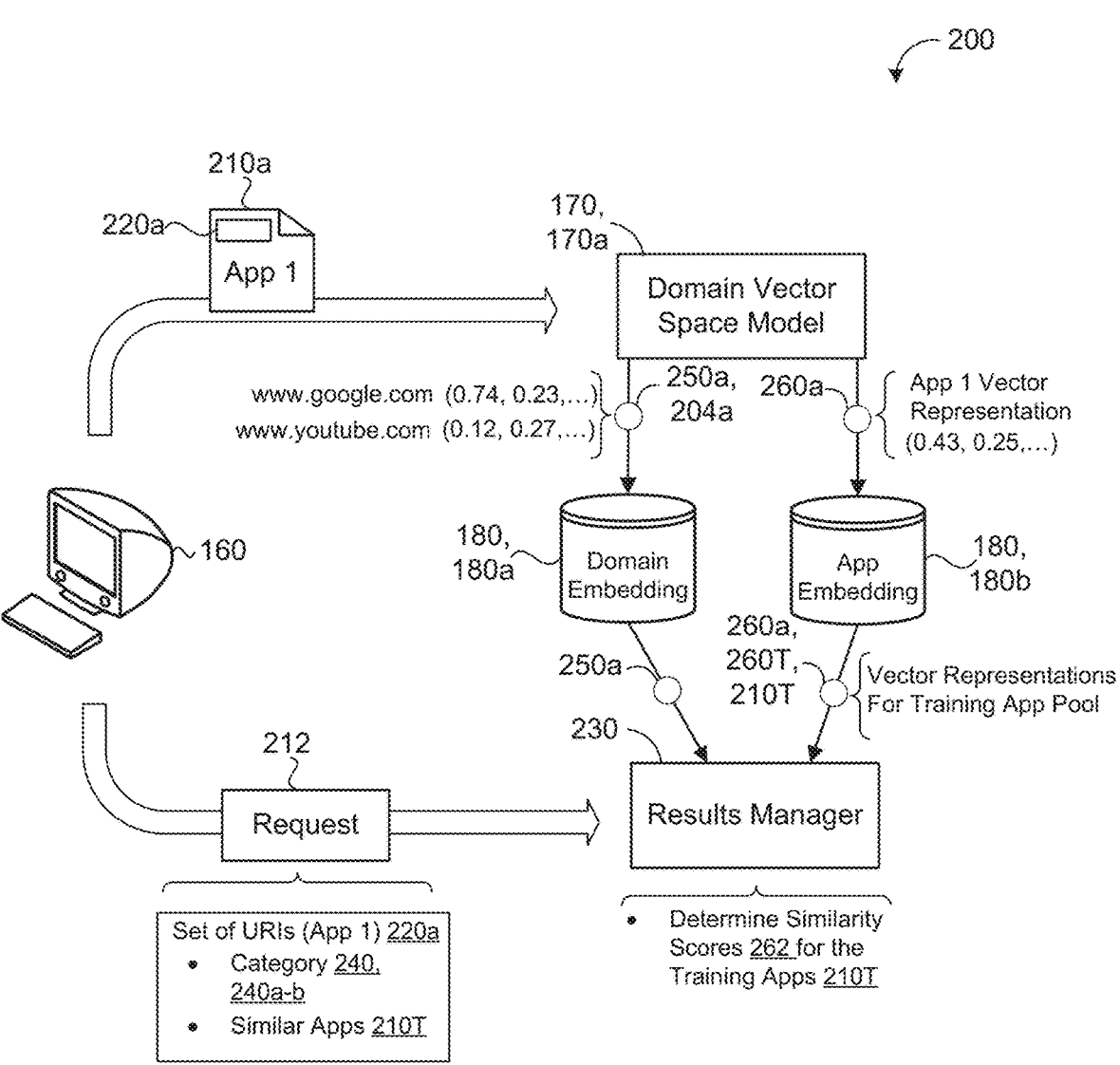

Referring to FIG. 2B, the domain embedding process 200 shows the emulator 160 executing a software application (App 1) 210*a* in a secure execution environment and identifying a plurality of domain names 220*a* the application 210*a* interacts with during execution of the application 210*a*. In the example shown, the emulator 160 provides the identified domain names 220*a* to the domain vector space model 170*a* and sends an inquiry 212 to a results manager 230 inquiring whether or not the application 210*a* belongs to a potentially harmful category 240, 240*b* and/or includes malware based on the identified domain domains 220. In some examples, the emulator 160 provides URLs 220*a* and the domain vector space model 170*a* and/or results manager 230 translates the received URLs 220*a* into respective domain names (e.g., www.google.com and www.youtube-.com)

The domain vector space model 170*a* is configured to receive the identified domain names 220*a* as feature inputs and determine an n-dimensional numerical vector representation 250, 250*a* (e.g., domain embedding) for each domain name 220*a*. The n-dimensional numerical vector representation 250 may include a 100-dimensional numerical vector representation within a free vector space. The domain vector space model 170*a* may store n-dimensional numerical vector representation 250*a* for each identified domain name 220*a* in domain embedding storage 180*a* of the data storage 180. For instance, the domain vector space model 170*a* may store a respective mapping (e.g., hash map) 204*a* between each identified domain name 220*a* and the corresponding n-dimensional numerical vector representation 250*a*. In some implementations, the domain vector space model 170*a* generates a corresponding vector representation 260*a* (e.g., aggregate application embedding) for the application (App 1) 210*a* by averaging the n-dimensional vector representations for the corresponding identified domain names 220*a*. In the example shown, the domain vector space model 170*a* stores the corresponding vector representation 260*a* for the application 210*a* in application embedding storage 180*b* of the data storage 180. Accordingly, the domain vector space model 170*a* continuously receives applications 210 as new training data for use in clustering applications 210 for identifying malware. Training applications 210*a* and corresponding vector representations 260*a* may be used to update the domain vector space model 170*a* on a daily basis.

In the example shown, in response to receiving the inquiry 212 including the identified domain names 220*a* (or receiving URIs/URLs for conversion into respective domain names), the results manager 230 retrieves the corresponding n-dimensional numerical vector representation 250*a* for each identified domain name 220*a* (i.e., using the corresponding mapping 204*a*) from the domain embedding storage 180*a* and calculates the corresponding vector representation 260*a* for the application 210*a* by averaging all of the n-dimensional numerical vector representations 250*a*. Optionally, the results manager 230 may instead retrieve the corresponding vector representation 260*a* generated by the domain vector space model 170*a* from the application embedding storage 180*b*. At the same time, the results manager 230 may retrieve training vector representations 260T for a pool of training applications 210T from the application embedding storage 180*b*.

In some implementations, the results manager 230 determines similarity scores 262 for the pool of training applications 210T based on the corresponding vector representation 260*a* for the application 210*a* and the training vector representations 260T. Each similarity score 262 is associated with a corresponding training application 210T and indicates a level of similarity (e.g., semantically related) between the corresponding vector representation 260*a* for the application (App 1) 210*a* and a respective training vector representation 260T for the corresponding training application 210T. In some examples, determining the similarity scores 262 includes calculating a respective cosine similarity between the corresponding vector representation 260*a* for the application (App 1) 210*a* and the respective training vector representation 260T for each corresponding training application 210T.

In some examples, the inquiry 212 associated with the set of identified domain names 220*a* representing the application (App 1) 210*a* requests the results manager 230 to suggest a category 240 associated with the application App 1) 210*a*. Here, the suggested category 240 may indicate that the application 210*a* belongs to a legitimate application category 240*a* or a potentially harmful application category 240*b* based on the similarity scores 262 for the pool of training applications 210T. Additionally or alternatively, the suggested category 240 may further specify a specific category type associated with the application 210*a* such as a news application, social media application, or a specific type of malware. Additionally or alternatively, the inquiry 212 may further request the results manager 230 to return a similarity list 270 that includes the training applications 210T associated with the top-k highest similarity scores 262. Here, the top-k highest similarity scores 262 may indicate a specified number k of nearest training vector representations 260T to the corresponding vector representation 260*a* for the software application. In other words, the similarity list 270 may include training applications 210T clustered near the application (App 1) 210*a*.

Figure 2C:
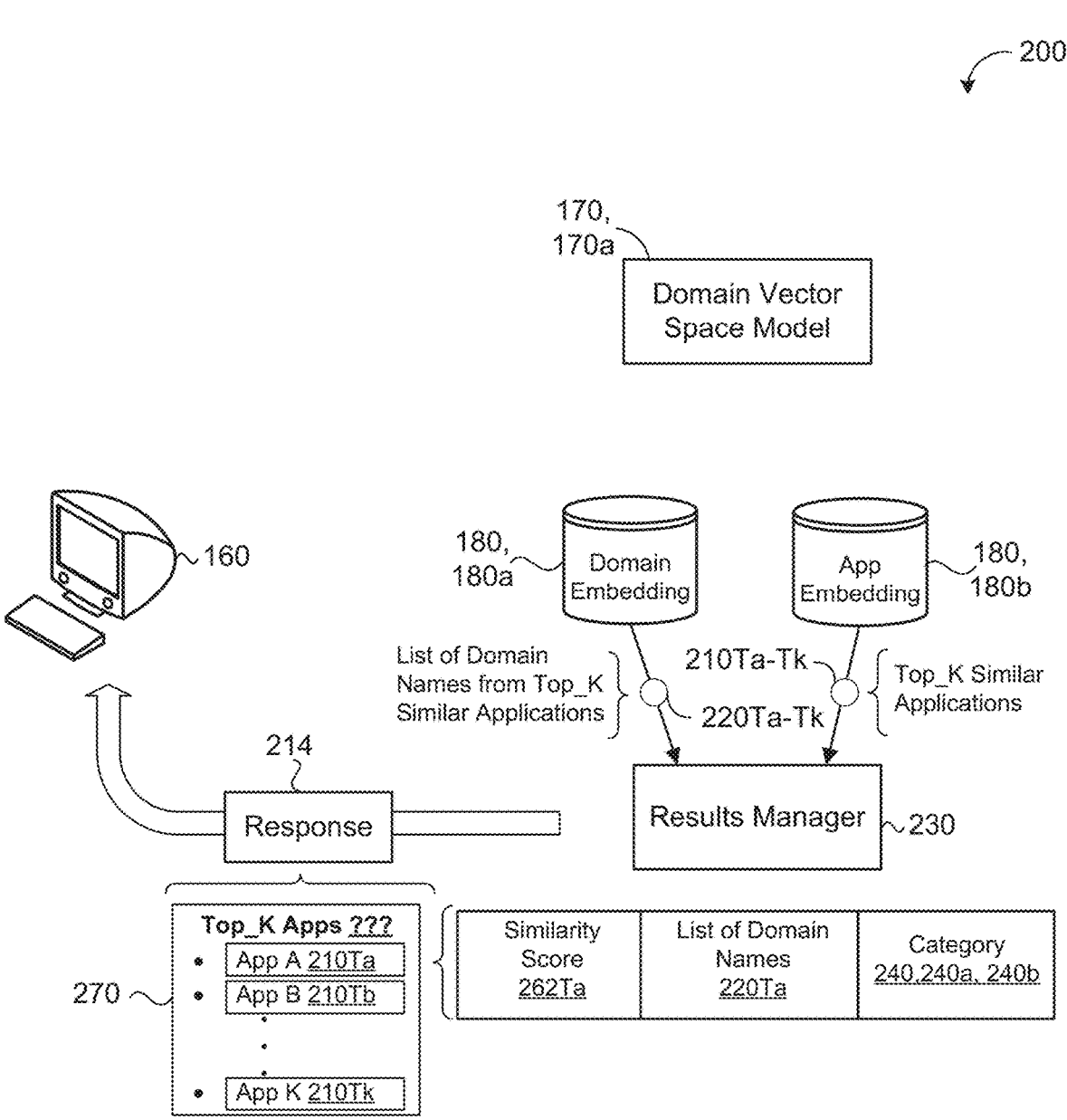

Referring to FIG. 2C, the results manager 230 generates a response 214 that includes similarity list 270 indicating all of the training applications 210T associated with the top-k highest similarity scores 262. In the example shown, after determining the similarity scores 262, the results manager 230 retrieves the top-k similar training applications 210Ta-Tk from the application embedding storage 180*b*. Here, the top-k similar training applications 210Ta-210Tk correspond to the training applications 210T associated with the top-k highest similarity scores 262. Additionally, the results manager 230 retrieves a list of domain names 220Ta-Tk that each of the top-k similar training applications 210Ta-Tk interact with. Thereafter, the results manager 230 generates the similarity list 270 to include the retrieved top-k similar training applications 210Ta-Tk and returns the response 214 including the similarity list 270 to the emulator 160. The inquiry 212 and response 214 between the results manager 230 and the emulator 160 may include remote procedure calls (RPCs). In some examples, each top-k similar training application 210Ta-Tk in the similarity list 270 includes the corresponding similarity score 262 and the corresponding list of domain names 220Ta-Tk. The similarity list 270 may additionally or alternatively include a category 240 (e.g., a legitimate application category 240*a* or a potentially harmful application category 240*b*). In the example shown, the first top-k similar training application (App a) 210Ta includes a corresponding similarity score 262Ta, a corresponding list of domain names 220Ta, and a category 240 assigned to the corresponding application 210Ta.

In some examples, training applications 210T within the application embedding storage 180*b* identified as belonging to potentially harmful application (PHA) categories 240*b* are labeled with a PHA label. In some configurations, the application embedding storage 180*b* is partitioned to include a separate embedding storage for training applications 210T including the PHA label. Partitioning of this separate embedding storage may reduce computational load when retrieving training vector representations $260T_{PHA}$ for all training applications $210T_{PHA}$ including the PHA label. Additionally or alternatively, one or more of the domain embedding storage 180*a*, the application embedding storage 180*b*, or the separate embedding storage including training applications 210T with PHA labels may use threads, cache techniques, and/or hash tables to reduce storage requirements and enhance performance for accessing stored data.

Figure 2D:
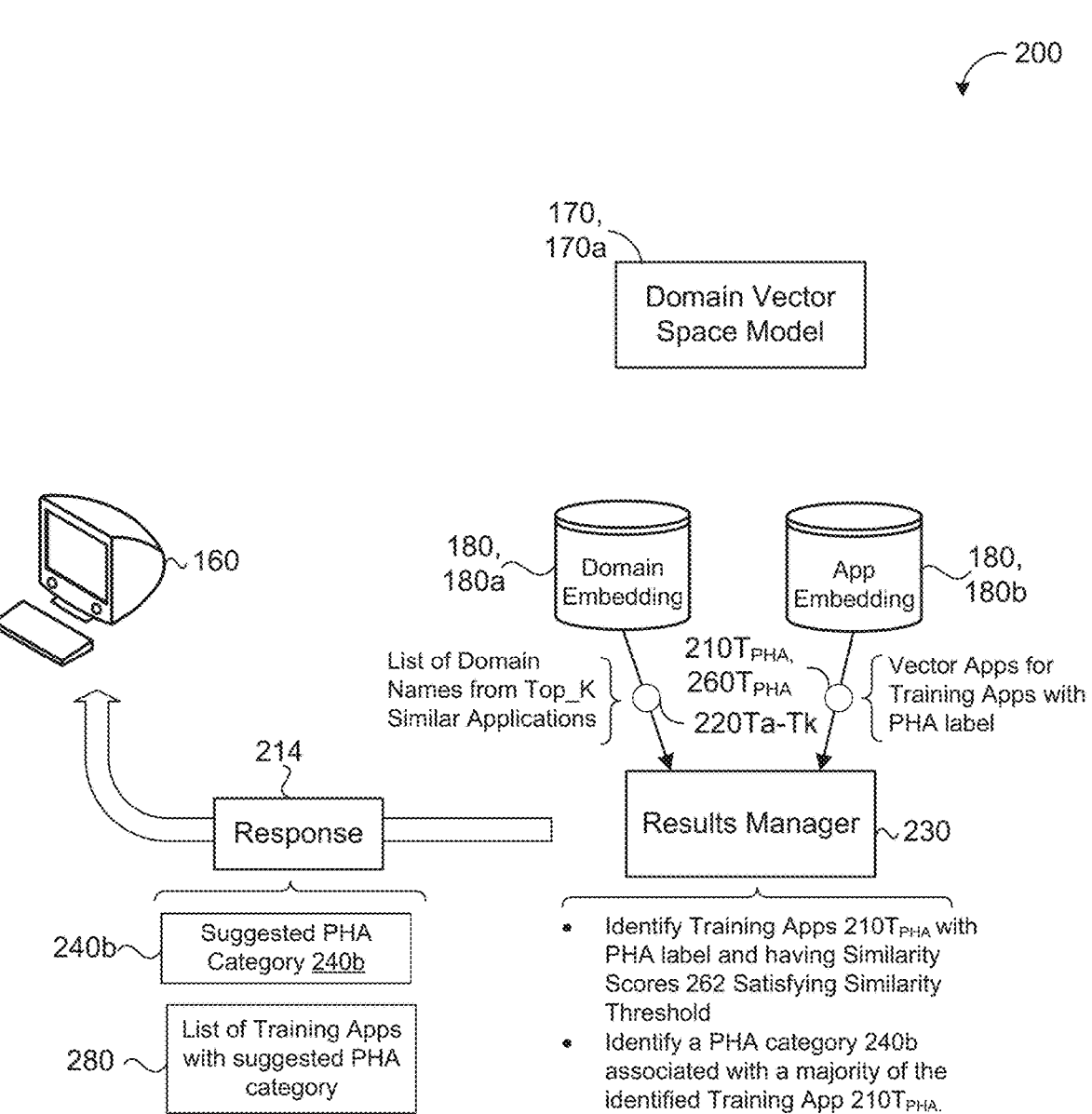

Referring to FIG. 2D, the results manager 230 generates a response 214 including a suggested PHA category 240*b* for the application 210*a* represented by the set of corresponding domain names 220*a* included in the inquiry 212 (FIG. 2A). In the example shown, the results manager 230 retrieves training vector representations $260T_{PHA}$ for all training applications $210T_{PHA}$ including the PHA label from the application embedding storage 180*b* and identifies which retrieved training applications $210T_{PHA}$ include corresponding similarity scores 262 that satisfy a similarity threshold. In some examples, a similarity score 262 satisfies the similarity threshold when the similarity score 262 exceeds the similarity threshold. Each similarity score 262 may include a respective cosine similarity between the corresponding training vector representation $260T_{PHA}$ for each training application $210T_{PHA}$ and the corresponding vector representation 260*a* for the application (App 1) 210*a*. For each training application $210T_{PHA}$ identified as satisfying the similarity threshold, the results manager 230 may determine a corresponding PHA category 240*b* associated with the identified application $210T_{PHA}$. In some examples, the results manager 230 determines the suggested PHA category 240*b* for the application 210*a* based on the identified PHA category 240*b* associated with a majority of the training applications $210T_{PHA}$ identified as satisfying the similarity threshold. For instance, the results manager 230 may use majority voting to assign the suggested PHA category 240*b* for inclusion in the response 214 returned to the emulator 160. The suggested PHA category 240*b* may include one of a hostile downloader application, a phishing application, a rooting Trojan application, a spyware application, a ransomware application, a malware application, an escalating privileges application. This list of potentially harmful categories 240*b* is non-exhaustive and may include any other application that is malicious or otherwise potentially harmful.

Implementations further include the process 200 flagging an application 210 as belonging to the PHA category 240*b* when one or more of the training applications $210T_{PHA}$ have similarity scores 262 that satisfy the similarity threshold and include the PHA label. Accordingly, and with reference to FIG. 1, when a customer device 104 sends a download request 190 to download an application 210 flagged as belonging to the PHA category 240*d* from the remote system 140, the malware identifier 150 may transmit a warning notification 192 to the user device indicating that the requested application 210 is flagged as belonging to the PHA category 240*b*.

Figure 3:
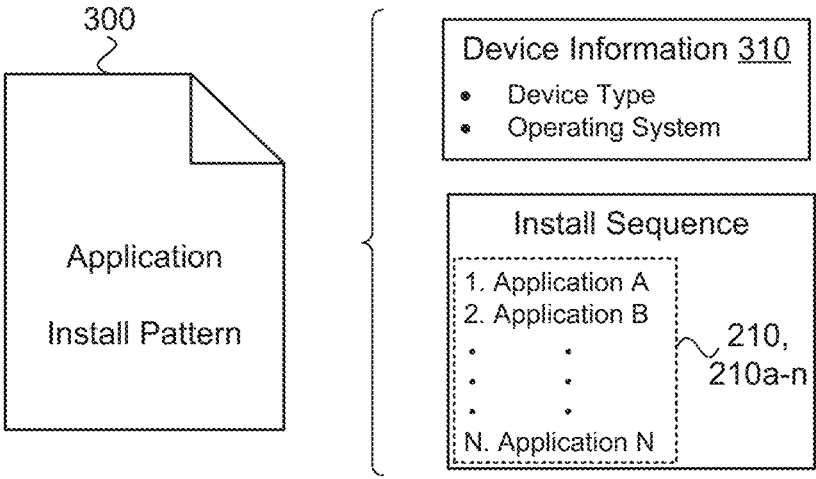
FIG. 3 is a schematic view of an example application install pattern.

FIG. 3 schematically illustrates an example application install pattern 300. In some implementations, the application install pattern 300 includes device information 310 indicating a device type for the customer device 104 associated with the application install pattern 300. For instance, the device type may specify that the customer device 104 is one of a smart phone, tablet, laptop, desktop, or other type of computing device. The device type may also include a make and model of the customer device 104. The device information 310 may further include an operating system of the customer device 104. The application install pattern 300 further indicates the corresponding sequence of n-applications 210, 210*a-n* (e.g., Application A, Application B, . . . , Application N) installed on the customer device 104. Here, the sequence orders the applications 210 by install date on the customer device 104. For instance, Application A may correspond to the first application 210*a* installed on the user device, Application B may correspond to the second application 210*b* installed on the customer device 104, and Application N may correspond to the last or most recent application 210*n* installed on the customer device 104. Accordingly, the application install pattern 300 may also include the application install date for each of the n-applications 210 installed on the customer device 104.

Figure 4:
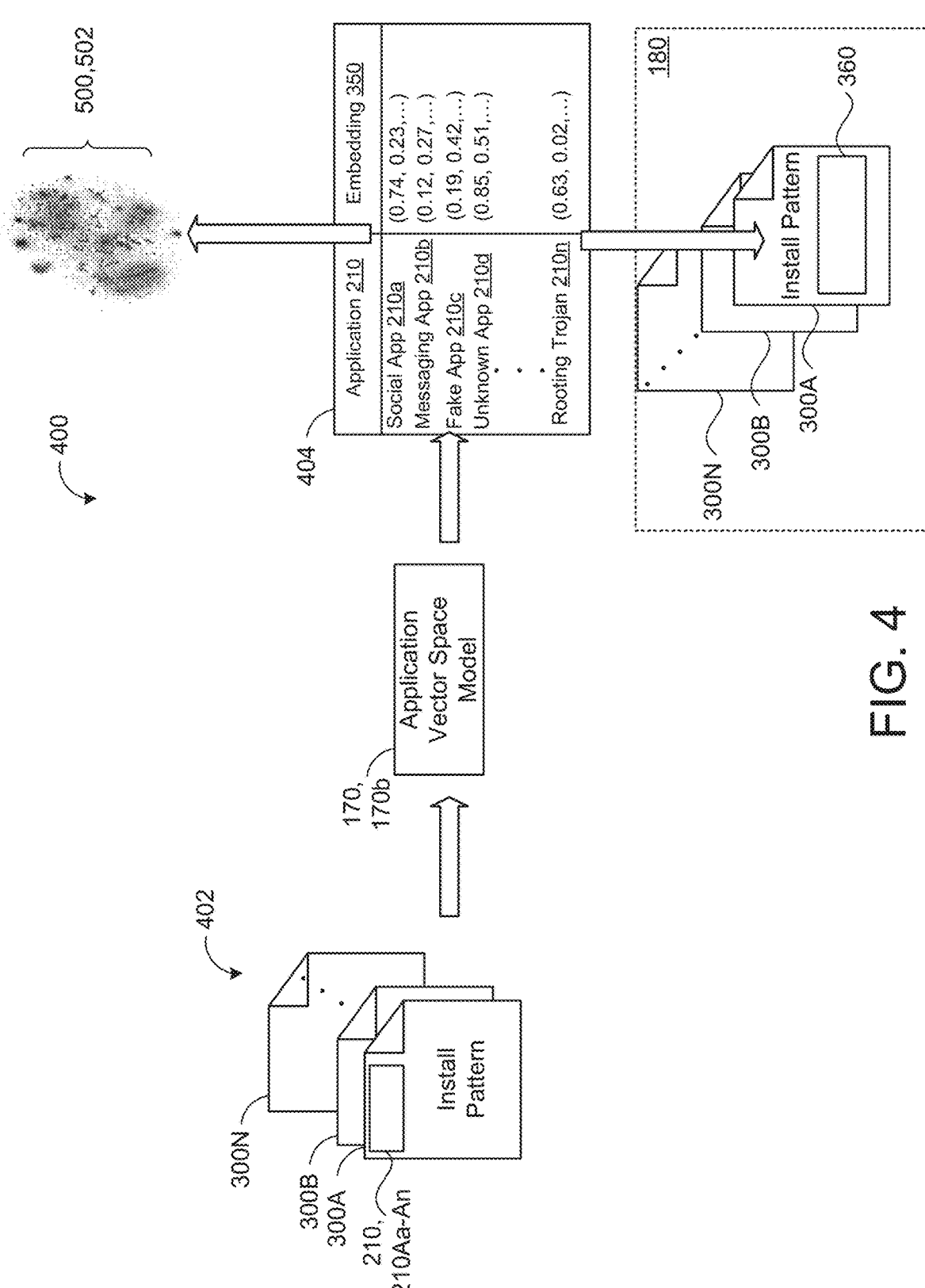
FIG. 4 is a schematic view of an example application embedding process for identifying malicious software.

Referring to FIG. 4, in some implementations, the malware identifier 150 of the data processing hardware 112 executes an application embedding process 400 for identifying malware. Referring to FIG. 4A, the process 400 receives a corpus 402 of application install patterns 300, 300A-N from corresponding customer devices 104, 104*a-n* with each application install pattern 300 including a corresponding sequence of n-applications 210 installed on the corresponding customer device 104. For instance, application install pattern 300A includes the corresponding sequence of n-applications 210, 210Aa-An. In some examples, the neural network model 170 includes an application vector space model 170*b* that receives each application 210 in a sequence of n-applications 210 associated with a corresponding application install pattern 300 as feature inputs and generates a corresponding numerical vector representation 350 (e.g., application embedding 350) for each application 210. While receiving a sequence of n-applications 210 belonging to a corresponding application install pattern 300, the neural network model 170 may predict the next application 210 installed on the customer device 104.

Thereafter, the neural network model 170*b* clusters each corresponding application 210 in a free vector space 502 based on the numerical vector representation 350 for the corresponding application 210. An application cluster plot 500 may map each numerical vector representation 350 (e.g., application embedding) to the free vector space 502 to semantically embed related applications 210 near one another. As the training data of application install patterns 300 input to the application vector space model 170*b* increases, the application vector space model 170*b* becomes more robust and forms many different groups of clusters where related applications are grouped/clustered together in the free vector space 502. As such, when multiple applications 210 in a given cluster are known/learned/identified to include malware or belong to a PHA category (e.g., include a PHA label), new or previously unidentified applications 210 grouped into the same given cluster may be identified as also including malware.

Similarly, since the neural network model 170 may predict the next application 210 installed on the customer device 104, when an actual next application 210 in a corresponding application install pattern 300 is different that the predicted next application 210, the actual next application 210 may correspond to a hostile downloader changing the application install pattern 300. In other words, if an application is installed which does not fit the prediction, a flag may be raise to indicate the identification of a possible hostile downloader.

Figure 5:
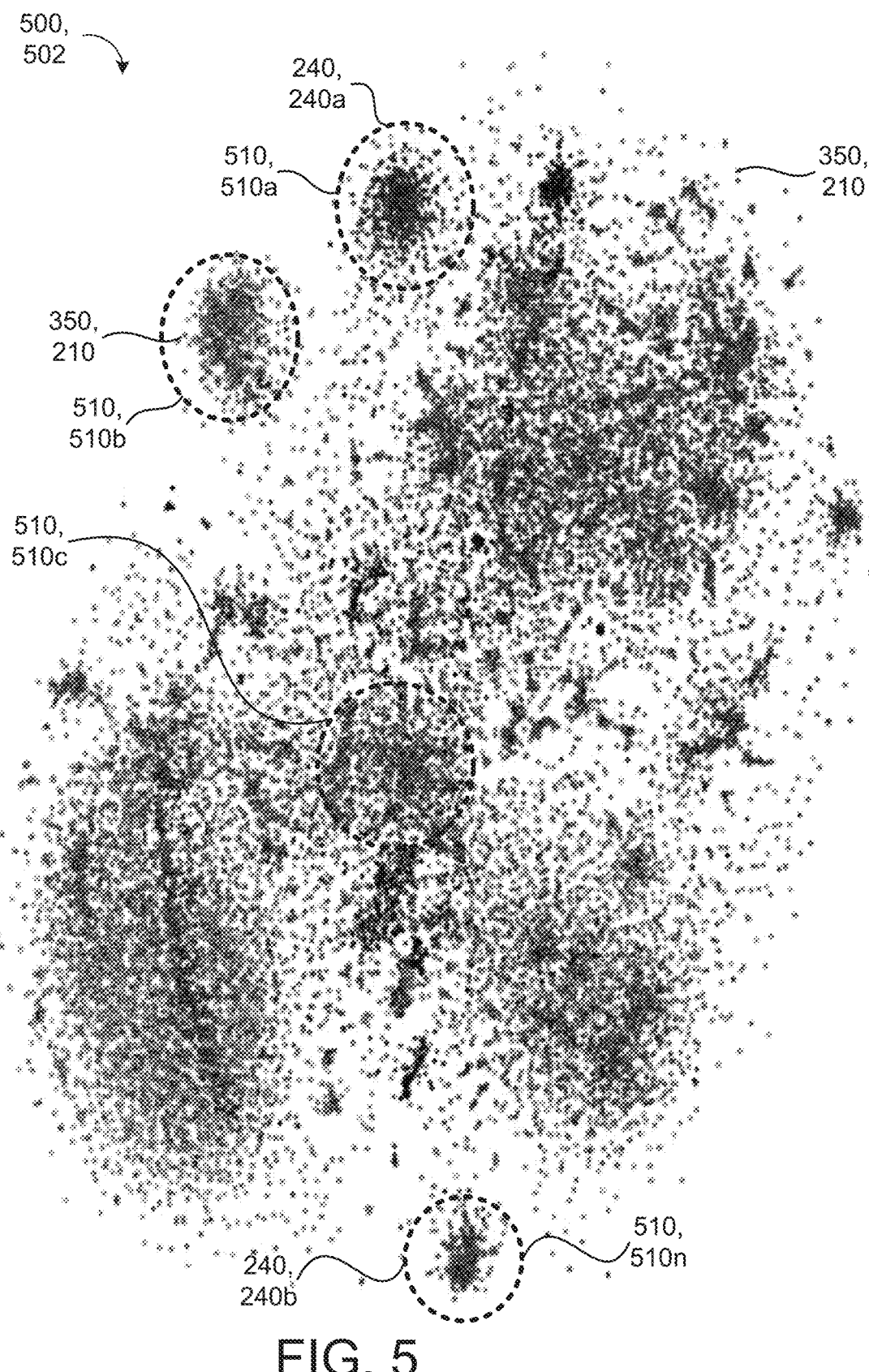
FIG. 5 is a schematic view of an example application cluster plot mapping application embeddings to a free vector space.

FIG. 5 shows an example plot 500 mapping applications 210 in the free vector space 502 based on the corresponding numerical vector representations 350 output from the application vector space model 170b. In the example shown, the numerical vector representations 350 include a SHA-256 digest representation embedded in the free/continuous vector space where semantically similar digests (e.g., embeddings 350) are embedded nearby each other to form clusters 510, 510a-n. Each cluster 510 may be used to learn/identify a corresponding application category 240, 240a-b associated with the applications 210 of the cluster 510. For instance, cluster 510n may belong to a PHA category 240b (e.g., Block Hostile Downloader) while cluster 510a may belong to a legitimate application category 240a.

The process 200 of FIGS. 2A-2D may similarly map applications 210 in a similar free vector space 502 based on the corresponding vector representations 260 in order to form clusters of related applications 210 based on the URIs 220 (domain names) each application 210 interacts with while executing on the emulator 160. Optionally, the domain vector space model 170a may map domain names in a free vector space 502 based on the corresponding domain embeddings 250 (cryptographic hashes) in order to cluster similar domain names close together. In this manner, the domain vector space model 170a may not only identify malware in applications 210, but may learn to identify domain names that are associated with malware.

Referring back to FIG. 4, in some implementations, each application embedding 350 is associated with a 100-dimensional numerical vector representation in the free vector space 502. In the example shown, the application vector space model 170b outputs a mapping (e.g., hash map) 404 between each application 210 and the corresponding application embedding 350. The hash map 404 associated with each application install pattern 300 may be stored in the data storage 180. In some examples, the application embedding 350 is represented as a cryptographic hash value, such as a SHA-256 hash. The application vector space model 170b may further determine a corresponding vector representation 360 for each application install pattern 300 that is composed of multiple hashes. Each hash in the vector representation 360 is associated with a corresponding application embedding 350 that represents a corresponding application 210 installed on the customer device 104. The hashes 350 in the vector representation 360 are ordered by application install date such that the first hash in the vector representation 360 identifies the first application 210 in the sequence of n-applications 210 installed on the customer device 104.

While the applications 210 of each install pattern 300 are ordered in sequence by the application install date, an actual date (e.g., Jan. 30, 2017) of when the applications 210 were installed on the customer device 104 is not included in the install pattern 300 provided to the application vector space model 170b. In fact, the applications 210 in the sequence of n-applications 210 correspond to application digests that do not include package names, install times, or any other information. Since the application digests do not preserve any structure, the application vector space model 170b will generate different application embeddings 250 (e.g., hashes) for different versions of the same application 210. However, it is with high probability that different versions of a same application will be clustered in close proximity to one another in the free vector space.

In the example shown, the hash map 404 associated with a corresponding application install pattern 300 includes each of the n-applications 210 ordered by install date and the corresponding application embedding 350 for each application 210. Each application embedding 350 may be a numerical vector representation (e.g., n-dimensional vector representation) or cryptographic hash. A first application 210a includes a Social App, a second application 210b includes a Messaging App, a third application 210c includes a Fake App 210c, the fourth application 210d is an Unknown App, and the last application 210n in the sequence of n-applications 210 is a rooting Trojan. The Social App 210a, Messaging App 210b, Fake App 210c, and Rooting Trojan 210d may be previously seen/identified applications 210 having assigned categories 240 (e.g., social, messaging, fake, rooting). Moreover, the Fake App 210c and the Rooting Trojan 210n may include PHA category labels indicating that the applications 210c, 210n have been previously identified as belonging to the PHA category 240b. On the other hand, the Social App 210a and the messaging App 210b are known applications that have been previously identified as belonging to the legitimate application category 240a. The Unknown App 210d has not been previously seen and the application category 240 associated with the Unknown App 210d is therefore unknown.

In some implementations, the process 400 determines whether the Unknown App 210d belongs to the legitimate application category 240a or the PHA category 240b based on where the cluster plot 500 maps the application embedding 350 (cryptographic hash/n-dimensional vector representation) representing the Unknown App 210d in the free vector space 502. For instance, if the process 400 groups the application embedding 350 for the Unknown App 210d into cluster 510n, the Unknown App 210d may be identified as potentially harmful and labeled as belonging to the PHA category 240b. On the other hand, if the process 400 groups the application embedding 350 into cluster 510a, the process 400 may identify the Unknown App 210d as a legitimate application and label the Unknown App 210d as belonging to the legitimate application category 240a.

In some examples, the application vector space model 170d identifies the Unknown App 210d as malware based on determining that the Fake App 210c and Rooting Trojan 210n were previously identified as malware. In these examples, since the Unknown App 210d is ordered close to the Fake App 210c in the sequence of n-applications 210, there is a very high probability that the Unknown App 210d is also malware. Upon identifying the Unknown App 210d as malware, the malware identifier 150 (FIG. 1) may label the App 210d as belonging to the PHA category 240b and then store the App 210d with both the PHA category label and the corresponding numerical vector representation 350 in the data storage 180. Accordingly, and with reference to FIG. 1, the malware identifier 150 may transmit a warning notification 192 to the user device indicating that the Unknown App 210d is identified as malware (e.g., flagged as belonging to the PHA category 240b. The warning notification 192 may further indicate the presence of the Fake App 210c, the Rooting Trojan 210n, and any other applications 210 in the sequence of n-applications identified as malware (e.g., belong to the PHA category 240b).

Figure 6:
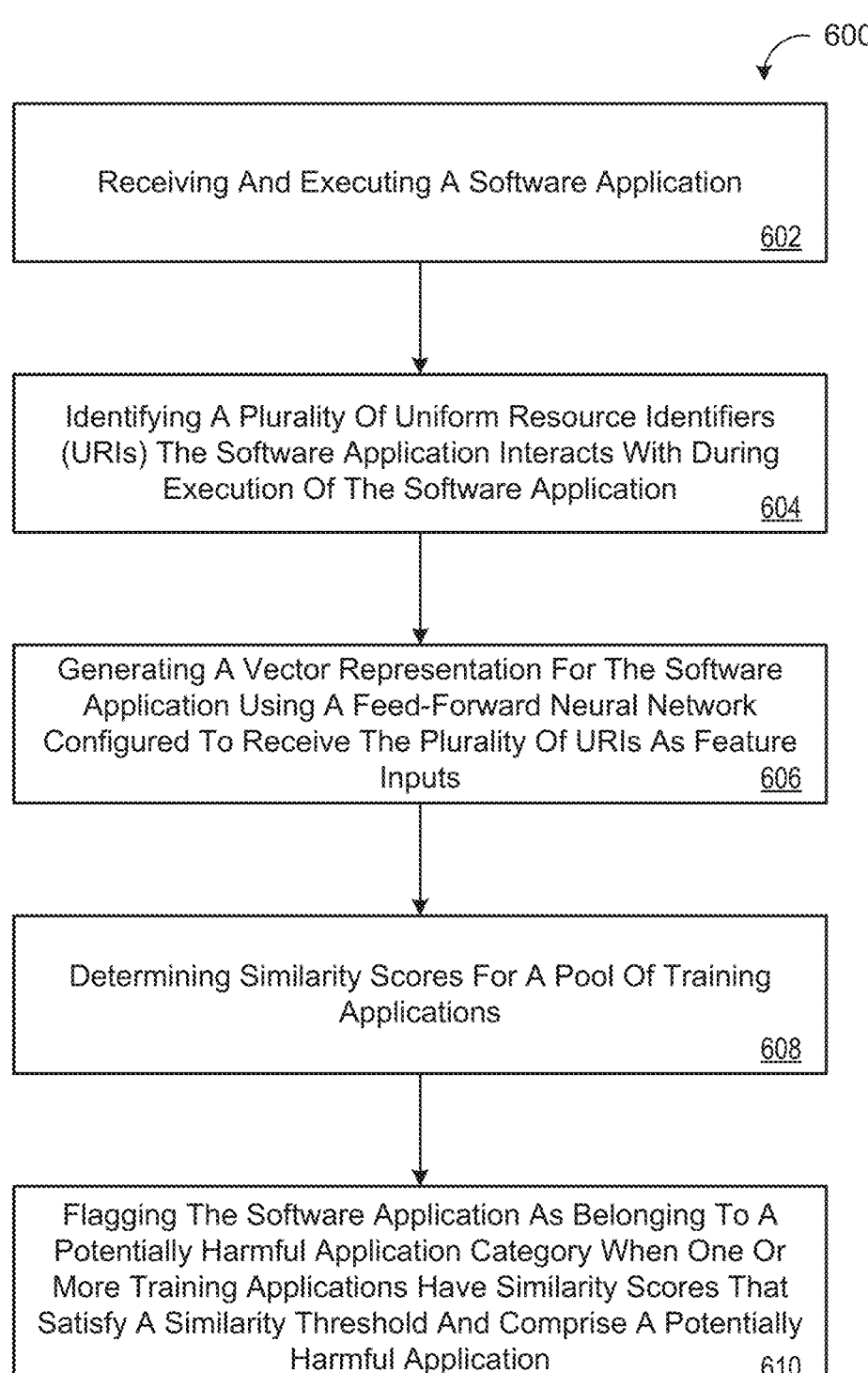
FIG. 6 is a flowchart of an example arrangement of operations for a method of identifying malicious software.

FIG. 6 is a flow chart of an example arrangement of operations for a method 600 of identifying malware. The data processing hardware 112 may execute the operations for the method 600 by executing instructions stored on the memory hardware 114. At operation 602, the method 600 includes receiving a software application 210 and executing the software application 210. An emulator 160 may execute the software application 210 in a secure execution environment. At operation 604, the method includes identifying a plurality of uniform resource identifiers (URIs) 220 the software application 210 interacts with during execution of the software application 210. The URIs may include uniform resource locators (URLs) such as domain names.

At operation 606, the method 600 includes generating a vector representation 260 for the software application using a feed-forward neural network (i.e., domain vector space model 170*a*) configured to receive the plurality of URIs 220 as feature inputs. Here, the model 170*a* determines an n-dimensional numerical vector representation 250 for each of the identified URIs 220 and calculates the vector representation 260 for the software application 210 by averaging the n-dimensional numerical vector representations 250 for the identified URIs 220.

At operation 608, the method 600 includes determining similarity scores 262 for a pool of training applications 210T stored in the memory hardware 114 (e.g., data storage 180). Each similarity score 262 is associated with a corresponding training application 210T and indicates a level of similarity between the vector representation 260 for the software application 210 and a respective vector representation 260T for the corresponding training application 210T.

At operation 610, the method 600 includes flagging the software application 210 as belonging to a potentially harmful application (PHA) category 240*b* when one or more of the training applications 210T have similarity scores 262 that satisfy a similarity threshold and include PHA label.

FIG. 7 is a flow chart of an example arrangement of operations for a method 700 of identifying malware. The data processing hardware 112 may execute the operations for the method 700 by executing instructions stored on the memory hardware 114. At operation 702, the method 700 includes receiving an application install pattern 300 from a user device 104, the application install pattern 300 indicating a sequence of n-applications 210 installed on the user device 104. At operation 704, for each application 210 in the sequence of n-applications, the method 700 includes generating a numerical vector representation 350 for the corresponding application 210 using a feed-forward neural network (i.e., application vector space model 170*b*) configured to receive each application 210 and order of each application 210 as feature inputs. The numerical vector representation 350 may include a cryptographic hash. At operation 706, for each application 210 in the sequence of n-applications, the method 700 includes clustering the corresponding application 210 in a free vector space 502 based on the numerical vector representation 350 for the corresponding application 210.

At operation 708, the method 700 includes determining whether any of the applications 210 in the sequence of n-applications 210 are clustered with training applications 210 identified as malware. At operation 710, the method 700 includes, for each application 210 clustered with training applications 210 identified as malware, identifying the corresponding application 210 in the sequence of n-applications as malware.

In some examples, the method 700 further includes, for each application in the sequence of n-applications identified as malware: labeling the application 210 as belonging to a potentially harmful application category 240*b* and storing the application 210 and the corresponding numerical vector representation 350 for the application 210 in memory hardware 114 (e.g., data storage 180) in communication with the data processing hardware 112.

A software application (i.e., a software resource) may refer to computer software that causes a computing device to perform a task. In some examples, a software application may be referred to as an "application." an "app." or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 8:
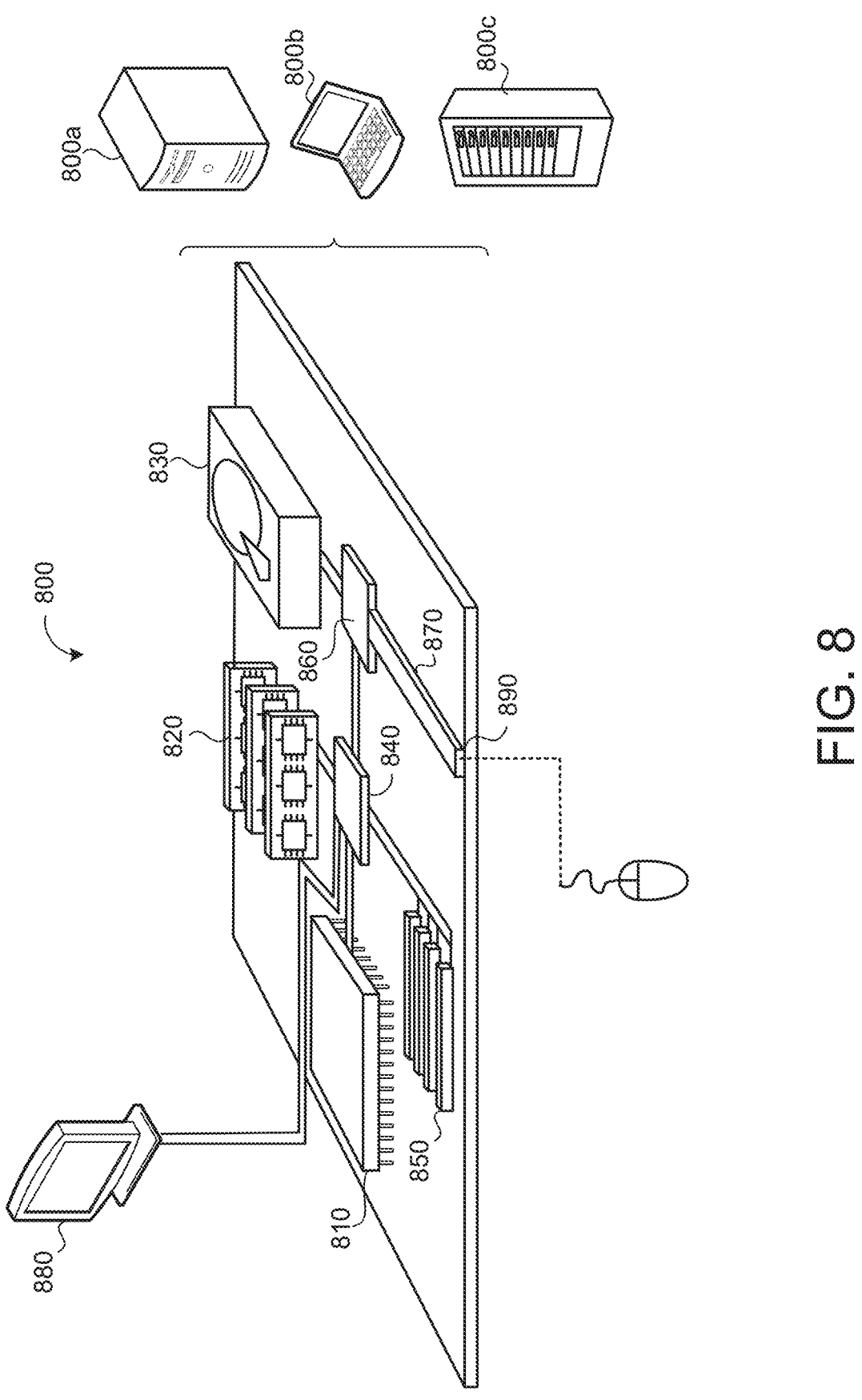
FIG. 8 is a schematic view of an example computing device that may be used to implement the systems and methods described herein.

FIG. 8 is a schematic view of an example computing device 800 that may be used to implement the systems and methods described in this document. The computing device 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 800 includes a processor 810, memory 820, a storage device 830, a high-speed interface/controller 840 connecting to the memory 820 and high-speed expansion ports 850, and a low speed interface/controller 860 connecting to a low speed bus 870 and a storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a graphical user interface (GUI) on an external input/output device, such as display 880 coupled to high speed interface 840. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 820 stores information non-transitorily within the computing device 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the computing device 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 830 is capable of providing mass storage for the computing device 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer-or machine-readable medium, such as the memory 820, the storage device 830, or memory on processor 810.

The high-speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and a low-speed expansion port 890. The low-speed expansion port 890, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 800a or multiple times in a group of such servers 800a, as a laptop computer 800b, or as part of a rack server system 800c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:

receiving an application install pattern from a user device, the application install pattern indicating a sequence of applications installed on the user device;

for each application in the sequence of applications, predicting, based on the sequence of applications, a next application in the sequence of applications;

determining, based on the sequence of applications, that the predicted next application in the sequence of applications differs from an actual next application in the sequence of applications; and based on determining that the predicted next application in the sequence of applications differs from the actual next application in the sequence of applications, identifying the actual next application in the sequence of applications as malware.

2. The method of claim 1, wherein the application install pattern comprises device information indicating a device type for the user device.

3. The method of claim 2, wherein the device type specifies that the user device is one of a smartphone, tablet, laptop, or desktop.

4. The method of claim 1, wherein the application install pattern further includes an operating system of the user device.

5. The method of claim 1, wherein the operations further comprise generating a numerical vector representation for each application in the sequence of applications using a feed-forward neural network model configured to receive each application as feature inputs.

6. The method of claim 5, wherein the numerical vector representation generated for each application comprises a cryptographic hash.

7. The method of claim 5, wherein the feed-forward neural network model comprises a vector space model configured to determine a dimensional numerical vector representation for each application in the sequence of applications installed on the user device.

8. The method of claim 7, wherein the vector space model is configured to cluster each application in the sequence of applications in a free vector space near training applications having similar dimensional numerical vector representations.

9. The method of claim 1, wherein the operations further comprise transmitting a warning notification to the user device indicating that the actual next application installed on the user device comprises malware.

10. The method of claim 1, wherein the operations further comprise labeling the actual next application as belonging to a potentially harmful application category, the potentially harmful application category comprising at least one of a hostile downloader application, a phishing application, a rooting trojan application, a spyware application, a ransomware application, a malware application, or an escalating privileges application.

11. A system for identifying malicious software, the system comprising:

data processing hardware;

memory hardware in communication with the data processing hardware, the memory hardware storing instructions that when executed by the data processing hardware cause the data processing hardware to perform operations comprising:

receiving an application install pattern from a user device, the application install pattern indicating a sequence of applications installed on the user device;

for each application in the sequence of applications, predicting, based on the sequence of applications, a next application in the sequence of applications;

determining, based on the sequence of applications, that the predicted next application in the sequence of applications differs from an actual next application in the sequence of applications; and based on determining that the predicted next application in the sequence of applications differs from the actual next application in the sequence of applications, identifying the actual next application in the sequence of applications as malware.

12. The system of claim 11, wherein the application install pattern comprises device information indicating a device type for the user device.

13. The system of claim 12, wherein the device type specifies that the user device is one of a smartphone, tablet, laptop, or desktop.

14. The system of claim 11, wherein the application install pattern further includes an operating system of the user device.

15. The system of claim 11, wherein the operations further comprise generating a numerical vector representation for each application in the sequence of applications using a feed-forward neural network model configured to receive each application as feature inputs.

16. The system of claim 15, wherein the numerical vector representation generated for each application comprises a cryptographic hash.

17. The system of claim 15, wherein the feed-forward neural network model comprises a vector space model configured to determine a dimensional numerical vector representation for each application in the sequence of applications installed on the user device.

18. The system of claim 17, wherein the vector space model is configured to cluster each application in the sequence of applications in a free vector space near training applications having similar dimensional numerical vector representations.

19. The system of claim 11, wherein the operations further comprise transmitting a warning notification to the user device indicating that the actual next application installed on the user device comprises malware.

20. The system of claim 11, wherein the operations further comprise labeling the actual next application as belonging to a potentially harmful application category, the potentially harmful application category comprising at least one of a hostile downloader application, a phishing application, a rooting trojan application, a spyware application, a ransomware application, a malware application, or an escalating privileges application.

* * * * *